United States Patent

[11] 3,580,222

[72] Inventor Jane M. Dunn
2113 N. Pacific Ave., Santa Cruz, Calif. 95060
[21] Appl. No. 841,410
[22] Filed July 14, 1969
[45] Patented May 25, 1971

[54] APPARATUS FOR HOLDING PETS
6 Claims, 9 Drawing Figs.
[52] U.S. Cl. .................................................. 119/102
[51] Int. Cl. .................................................. A61d 03/00
[50] Field of Search .......................................... 119/102, 100, 96, 98, 99, 103

[56] References Cited
UNITED STATES PATENTS
| | | | |
|---|---|---|---|
| 678,117 | 7/1901 | Koch | 119/102 |
| 1,318,202 | 10/1919 | Garnier | 119/100 |
| 1,879,915 | 9/1932 | Smoot | 119/102X |
| 2,804,845 | 9/1957 | Plumley et al. | 119/102 |

Primary Examiner—Hugh R. Chamblee
Attorney—Allen and Chromy

ABSTRACT: Apparatus for holding a dog or small animal in position during grooming provided with two cords having loops at the lower ends thereof for attaching to different parts of the animal. The upper parts of these cords are attached to spring-loaded reels which are supported on a shaft in a frame which is adapted to be attached to the ceiling of the dog grooming parlor. The reels are provided with members cooperating with a latch which is adapted to lock the reels in predetermined position after the looped parts of the cords are placed on the animal to hold it in grooming position. The latch is controlled by a manually operable cord attached thereto. A hook member is provided to the latch and this is adapted to be received by a locking device when the hook member is inserted therein by exerting pulling effort on the cord. Exerting further pulling effort on the cord serves to release the hook member from the locking device, thereby disengaging the latch and permitting rotation of the reels.

Patented May 25, 1971 3,580,222

INVENTOR.
JANE M. DUNN

BY Allen and Chimny
ATTORNEYS

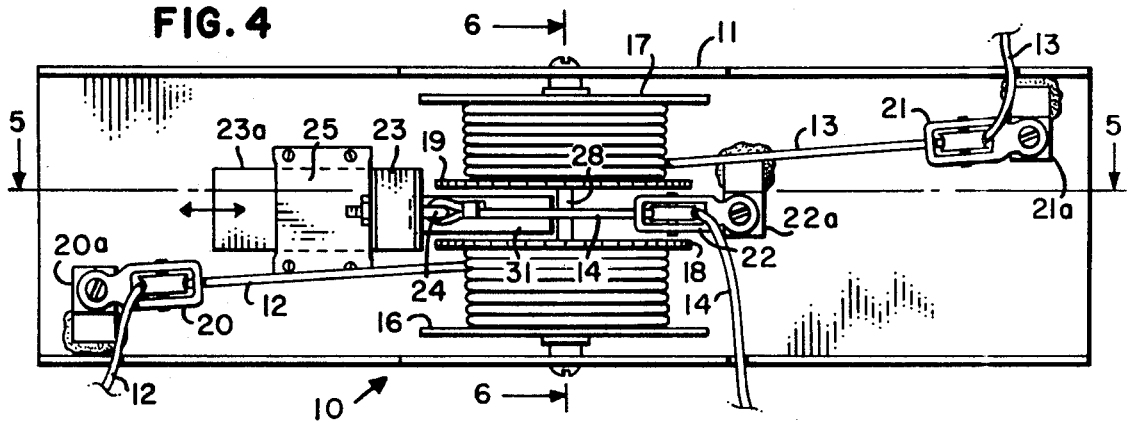
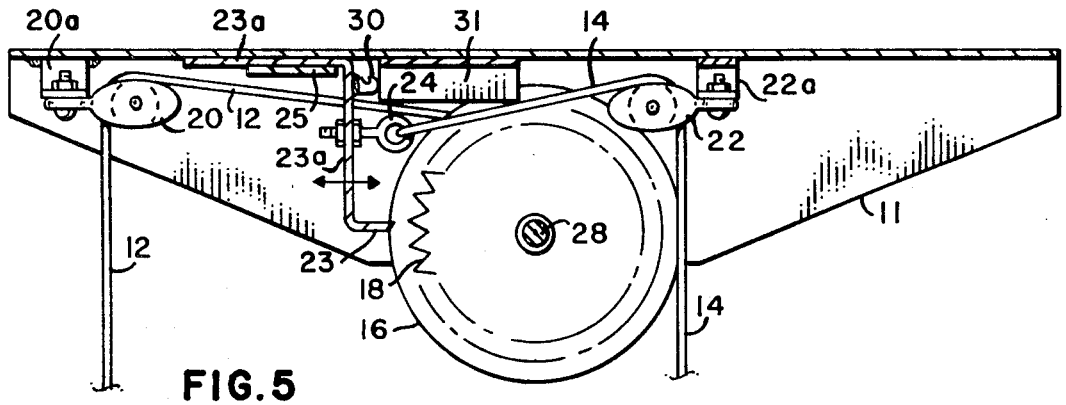
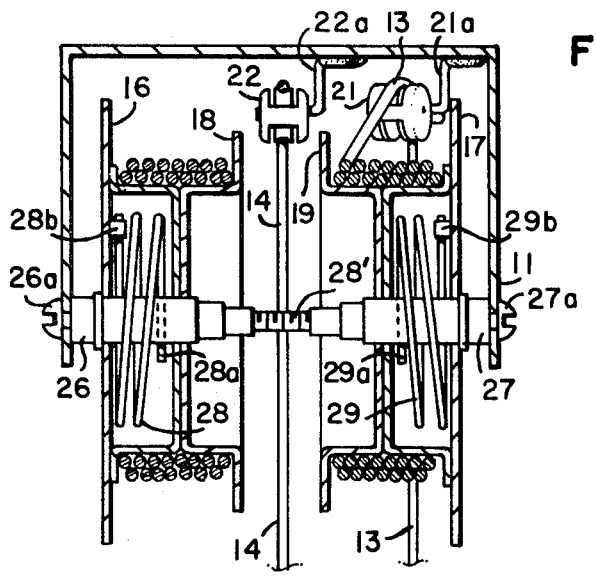
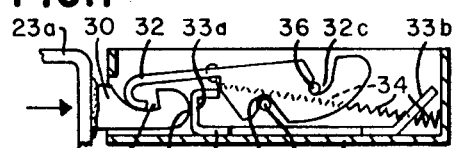
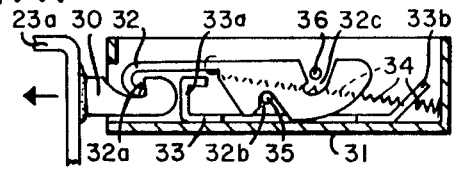

APPARATUS FOR HOLDING PETS

DESCRIPTION OF THE INVENTION

This invention relates to a device for holding dogs and other small animals in predetermined position during grooming thereof.

An object of this invention is to provide an improved device for holding dogs and other small animals during grooming thereof, said device being efficient in use and making it relatively easy to groom even a large unruly dog without inflicting harm or pain thereto, and without using drugs such as tranquilizers to keep the animal in submission.

Another object of this invention is to provide an improved device for holding dogs and other small animals during grooming thereof, said device being constructed so that it is easy to use and holds the animal during grooming in a selected predetermined position at the operator's working level, yet permits the animal to be quickly released therefrom so as not to be hung therein should the animal desire to leave the working surface.

Another object of this invention is to provide an improved device for holding a dog or other small animal during grooming thereof, said device being provided with a pair of cords which are adapted to be attached to the animal in order to hold it in proper position on the working surface, the cords being attached to spring-loaded reels which are supported by a frame member attached to the ceiling of the grooming parlor, said reels being provided with a clutch or gripping device which is actuated by a cord controlled by the operator so that after the cords are attached to the animal the operator can restrain the reels from rotation.

Other and further objects of this invention will be apparent to those skilled in the art to which it relates from the following specification, claims and drawing in which, briefly:

FIG. 4 is a bottom view of the device showing the frame which is adapted to be attached to the ceiling of the grooming parlor for supporting the cord reels and latching device;

FIG. 5 is a sectional view taken along the line 5-5 of FIG. 4;

FIG. 6 is a sectional view taken along the line 6-6 of FIG. 4;

FIG. 7 is a detail sectional view of the latch-locking device showing the hook of the latch inserted into the locking device preparatory to locking thereof;

FIG. 7A is a sectional view similar to FIG. 7 showing the hook of the latch locked in the locking device; and FIG. 7B is a sectional view similar to FIGS. 7 and 7A showing the hook of the latching device being released from the locking device.

Figure 1:
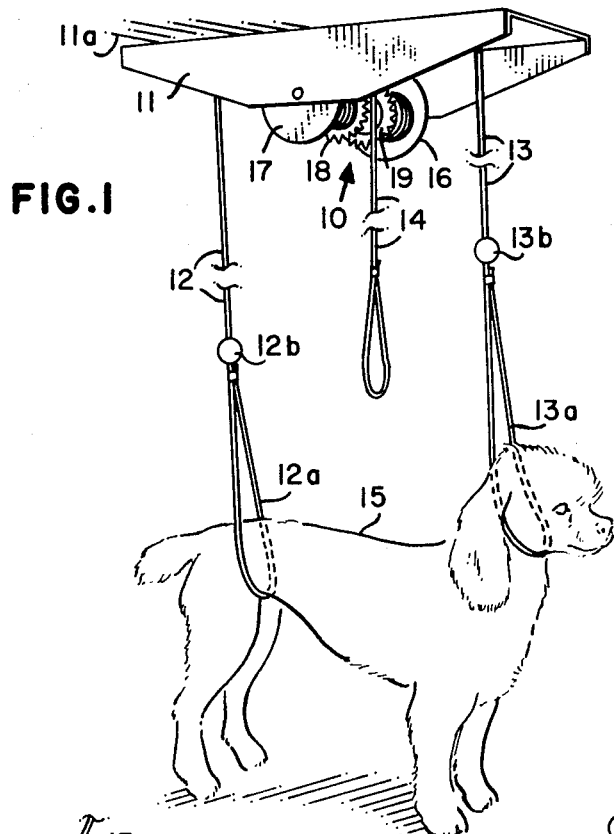
FIG. 1 is a view showing this apparatus attached to the ceiling of the grooming parlor and the two cords thereof attached one to the front of the dog and the other to the rear to hold the dog in proper grooming stance.
Figure 2:
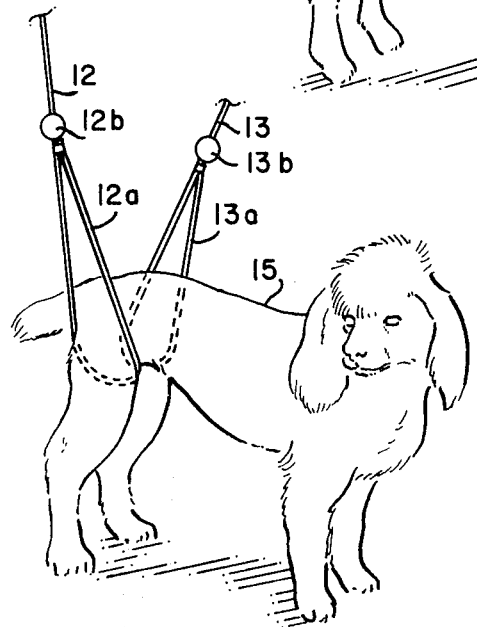
FIG. 2 is a view showing the two cords of this apparatus attached to the hind quarters of the dog, which may be preferable for large dogs.
Figure 3:
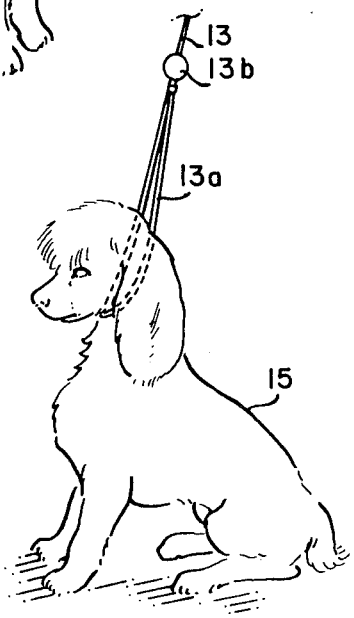
FIG. 3 is a view of a dog in sitting position with one of the cords positioned around the dog's neck.

Referring to the drawing in detail, there is shown a device 10 having a frame 11 which is adapted to be attached to the ceiling of a dog-grooming parlor by suitable attaching means such as screws, nails, etc. The device is provided with cords 12 and 13 having loops 12a and 13a, respectively, for receiving both the rear and front portions of a dog 15, as shown in FIG. 1, to hold the dog properly positioned on a work surface such as a table during the grooming of the dog.

The cords 12 and 13 are attached to the spring-loaded reels 16 and 17, respectively, which are provided with notched circular members 18 and 19, respectively. Suitable pulleys 20 and 21, which are attached to brackets 20a and 21a, respectively, are provided for guiding the cords 12 and 13, respectively, from the reels 16 and 17, respectively, toward the work surface on which the dog 15 is adapted to be positioned. Brackets 20a and 21a may be attached to the frame 11 by brazing, spot welding or the like, or they may be portions of the frame that are struck out of the frame itself and bent outward to form suitable supports for the pulleys 20 and 21a, respectively, which are adapted to be attached thereto by suitable bolts, or which may be attached thereto by brazing, welding or the like, or suitable adhesive such as epoxy resins or the like.

The control cord 14 is attached to the eyebolt 24 which is fixedly held on the latch 23 by a suitable nut. The latch 23 is provided with a horizontally extending portion that is adapted to engage the tooth wheels 18 and 19 of the reels 16 and 17, respectively, as will be described hereinafter. The latch 23 is also provided with a supporting portion 23a which is slidable under the bridging member 25 which is attached to the frame 11 by suitable screws, as shown in FIG. 4.

Another pulley 22 is attached to the bracket 22a by bolt 22a' or by brazing, welding or suitable adhesives, as in the case of the pulleys 20 and 21. The bracket 22a is also attached to the frame 11 by brazing, welding or the like, or it may be made of a portion of the frame 11 struck therefrom and bent in the form of a bracket to support the pulley 22 away from the frame so that this pulley may function to guide the control cord 14 downward from the frame.

The reels 16 and 17 are supported on suitable bearing members 26 and 27, respectively, shown in FIG. 6, which are supported on the frame member 11 by suitable bolts 26a and 27a which are threaded into the end portions of the bearing members 26 and 27, respectively, so that these bearing members are fixedly supported on the frame. The inner ends of the bearing members are also threaded and receive the threaded rod 28'. Suitable springs 28 and 29 are provided in the reels 16 and 17. The ends 28a and 29a of these springs are fixedly attached to the bearing members 26 and 27, respectively, by inserting these end portions into holes provided in these bearing members. The ends 28b and 29b are fixedly attached to the reels 16 and 17, respectively. Thus, when the reels 16 and 17 are rotated to pay out the cords 12 and 13, respectively, the tensions of the springs 28 and 29, respectively, are increased. The tensions of these springs are such that when the cords 12 and 13 are retracted so that the rubber balls 12b and 13b attached to these cords adjacent to the loops 12a and 13a, respectively, are against the pulleys 20 and 21, respectively, a certain amount of tension on the order of 1 or 2 pounds is applied to each of the cords.

The latch 23 is provided with a hook 30 which extends into the locking device 31, as shown in the sectional view FIG. 7.

The locking device 31 is provided with a slidable catch 32 which is adapted to be brought into engagement with the hook 30 when the latch 23 is pulled forward by cord 14. A slidable member 33 is positioned so that the forward portion 33a thereof is adapted to be engaged by the forward portion 30a of the hook 30 when the hook is advanced into the locking device 31. Before the hook 30 is inserted into the locking device 31, catch 32 is elevated around pin 36 toward the left end wall of the device 31 and end 33a of member 33 which is positioned in the left end opening of the device. Catch 32 and member 33 are caused to assume these positions by spring 34 which is connected therebetween. One end of the spring 34 is attached to the portion 33b of the member 33, and the other end of this spring is attached to the catch 32 in a suitable hole formed therein. Two pins 35 and 36 are provided between the sides of the locking device 31. Catch 32 is provided with recesses 32b and 32c which are substantially larger than the diameters of the pins 35 and 36, respectively. These recesses are provided for the purpose of permitting a toggle action in the catch 32 when the hook 30 is advanced into the locking device 31 to the extent shown in FIG. 7B. This toggle action swings the portion 32a of catch 32 out of engagement with the hook 30. The catch 32 is held in this position by the spring 34 so that the hook 30 is adapted to be pushed out of the locking device 31 by member 32 as this member moves to the left. Thus, latch 23 is disengaged from the tooth wheels 18 and 19.

If desired, the latch 23 may be made in the form of a clutch which is adapted to engage different parts of the reels 16 and 17 or the cords 12 and 13, and the teeth eliminated from wheels 18 and 19. The clutch may of course be made of suitable width for this purpose to provide the desired holding action. Also, suitable linings may be provided to the clutch. Furthermore, the tooth wheels 18 and 19 may be made separate from the reels and they may be attached thereto by suitable bolts or adhesive such as epoxy resin.

The operation of this device is as follows. A dog 15 is placed on the table or work surface and the loop 12a is placed around the rear portion of the dog as shown in FIG. 1. Also, the loop 13a is placed around the dog's neck. In order to do this the operator must, of course pull down on the cord 12 against the tension of the spring 28 in reel 16, and he must also pull down on the cord 13 against the tension of the spring 29 in reel 17. The tensions of the springs 28 and 29 are such that the pull on each of the cords 12 and 13 is small, being on the order of 1 or 2 pounds, just sufficient to hold the cords taut until the latch 23 is set by the operator. When the dog 15 is in the desired position, the operator pulls on cord 14 to insert the hook 30 in the locking device 31 so that the latch 23 is brought into engagement with the teeth on the members 18 and 19 to lock the reels 16 and 17 in position. Should the dog become panicky and try to leap off of the worktable, the operator can release the locking device 31 by pulling on the cord 14 so that the dog will not be hung as more cord 12 and 13 will be paid out by the reels 16 and 17, respectively.

When the operator pulls on the cord 14 to release the hook 30 from the locking device 31, this further pulling causes the hook 30 to push the slidable member 33 to move further to the right, as shown in FIG. 7B, thereby causing the catch 30 to be toggled upward out of the way of hook 30. Hook 30 is then pressed out of locking device 31 by member 33, as previously described, and latch 23 is released from wheels 18 and 19 of the reels. More of the cords 12 and 13 may be paid out from these reels or the cords may be wound on the reels until the rubber stops 12b and 13b engage pulleys 20 and 21 to hold the cords out of the way.

While I have shown a preferred embodiment of this invention, it will be understood that the invention is capable of variation and modification from the form shown so that the scope thereof should be limited only by the proper scope of the claims appended hereto.

I claim:

1. In a device for holding a dog or similar small animal in position during grooming thereof, the combination comprising cord means adapted to be positioned on the dog while the dog is on the work surface for grooming, a frame supported above the work surface, reel means supported by said frame, said cord means attached to said reel means, spring means driving said reel means and applying tension to said cord means so that said cord means paid out by said reel means is held taut when the animal is positioned on said work surface and is engaged by said cord means to assume the desired position during grooming, means holding said cord means in predetermined paid out position, and manually operable means controlling said last-mentioned means.

2. In a device for holding a dog or similar small animal in position during grooming thereof, the combination as set forth in claim 1 further characterized in that said manually operable means includes a locking device adapted to grip said holding means to hold said cord means in predetermined paid out position, said manually operable means being adapted to operate said locking device to release its grip on said holding means.

3. In a device for holding a dog or similar small animal in position during grooming thereof, the combination as set forth in claim 1 further characterized in that said holding means comprises means arresting rotation of said reel means, and said manually operable means includes a cord attached to said last-mentioned means to actuate said arresting means.

4. In a device for holding a dog or similar small animal in position during grooming thereof, the combination as set forth in claim 3 further characterized in that said arresting means comprises means engaging said reel means, and means slidably supporting said engaging means on said frame.

5. In a device for holding a dog or similar small animal in position during grooming thereof, the combination as set forth in claim 4 further characterized in that said holding means includes a hook and a locking device, said manually operable means being adapted to advance said hook into said locking device to locking position when it is desired to hold said cord means in predetermined paid out position, said manually operable means being adapted to advance said hook into said locking device further to cause said locking device to release said hook so that said arresting means is released from said reel means.

6. In a device for holding a dog or similar small animal in position during grooming thereof, the combination as set forth in claim 1 further characterized in that said cord means comprises two cords which are adapted to be attached to different parts of the animal, and said reel means comprises two reels, one reel for each of said cords, and said manually operable means being adapted to control said holding means either to permit paying out said cords or to permit said reels to reel in paid out cords.